(12) United States Patent
Godsall et al.

(10) Patent No.: US 6,877,968 B2
(45) Date of Patent: Apr. 12, 2005

(54) LOW HEAD WATER TURBINE

(75) Inventors: Terrence Gordon Godsall, Tamworth (CA); Donald Eric Innes, Tamworth (CA); Matthew Christopher Innes, Montreal (CA)

(73) Assignee: The Salmon River Project Limited, Ontario (CA)

( * ) Notice: Subject to any disclaimer, the term of this patent is extended or adjusted under 35 U.S.C. 154(b) by 28 days.

(21) Appl. No.: 10/305,360

(22) Filed: Nov. 27, 2002

(65) Prior Publication Data

US 2004/0101397 A1 May 27, 2004

(51) Int. Cl.[7] .................................................. F03B 7/00
(52) U.S. Cl. ........................ 418/268; 415/3.1; 415/141; 415/185; 415/186; 415/125; 415/906
(58) Field of Search ........................ 415/3.1, 140, 141, 415/202, 125, 906, 183, 185, 186, 208.5; 416/240, 134 R, 135, 88, 89, 111–112, 116, 117, 119; 418/268

(56) References Cited

U.S. PATENT DOCUMENTS

| 109,335 A | * | 11/1870 | Morgan | 415/141 |
| 227,576 A | * | 5/1880 | Read | 415/141 |
| 3,983,404 A | * | 9/1976 | Sherrard | 415/3.1 |
| 4,263,516 A | * | 4/1981 | Papadakis | 415/3.1 |
| 4,923,368 A | * | 5/1990 | Martin | 415/202 |
| 6,554,596 B1 | * | 4/2003 | Patterson et al. | 418/260 |

* cited by examiner

*Primary Examiner*—Christopher Verdier
(74) *Attorney, Agent, or Firm*—Nixon Peabody LLP; Jeffrey L. Costellia

(57) ABSTRACT

A low head water turbine comprising a runner having a cylindrical outer surface and a plurality of similar blades similarly pivotably secured along their inner sides to the outer surface of the runner so as to pivot in the direction of rotation of the runner between a closed position lying adjacent the outer surface of the runner and an open position at an angle thereto. A housing having end walls and a rounded side wall extending therebetween, completely encases the runner and its blades. The runner is eccentrically mounted to end walls of the housing for rotation about a horizontal axis so that the cylindrical outer surface is spaced closer to an upper portion of the housing side wall and farther from a lower portion. A water inlet opening is located in a lower, forward portion of the housing, below the axis of rotation of the runner. A water outlet opening is located in a lower, rearward portion of the housing. During operation of the turbine, the blades will be constricted by the side wall of the housing and thereby moved to the closed position as they approach and pass the upper portion of the housing side wall, and will move to the open position under force of gravity, water and centrifugal force acting on them as they move below the axis of rotation of the runner to the lower position, all the time the housing side wall acting on the outer sides of the blades.

10 Claims, 5 Drawing Sheets

LOW HEAD WATER TURBINE

FIELD OF THE INVENTION

The present invention relates to an improvement in low head water turbines, and more particularly to turbines which can capture energy from heads of water from about six meters, down to about one meter, for use, for example, in generating electricity.

BACKGROUND OF THE INVENTION

Traditionally, low head water turbines have been of an open type, as exemplified for example by conventional water wheels, and have had extremely low efficiency. This has meant, for example, that sections of small rivers having a low head or drop, have been unsuitable for generation of hydro electric power. Conventional power generation turbines such as Francis turbines, Kaplan turbines and Peleton turbines traditionally require high heads of water to generate the water pressure and velocity required to move the turbine blades. Such arrangements have necessitated large dams, construction of flumes and the like, necessitating, often, massive capital expenditure.

The present invention is intended to provide a more efficient construction of turbine which can be economically constructed, and which will operate at higher efficiency, making it suitable for low head electric power generation applications.

SUMMARY OF THE INVENTION

In accordance with the present invention there is provided a low head water turbine comprising a runner having a cylindrical outer surface extending between opposite ends and a plurality of similar blades having inner and outer sides extending to the ends. The blades are evenly spaced about the surface of the runner and extend to the ends of the runner. The blades are similarly pivotably secured along their inner sides to the outer surface of the runner so as to pivot in the direction of rotation of the runner between a closed position lying adjacent the outer surface of the runner and an open position at an angle thereto. A housing having end walls and a rounded side wall extending therebetween, completely encases the runner and its blades. End walls of the housing are proximal to the ends of the runner. The runner is eccentrically mounted to the end walls of the housing for rotation about a horizontal axis so that the cylindrical outer surface of the runner is spaced closer to an upper portion of the housing side wall and farther from a lower portion. A water inlet opening is located in a lower, forward portion of the housing, below the axis of rotation of the runner. A water outlet opening is located in a lower, rearward portion of the housing. The blades are constructed and positioned so that, during operation of the turbine, the blades will be constricted by the side wall of the housing and thereby moved to the closed position as they approach and pass the upper portion of the housing side wall, and will move to the open position under centrifugal force and the force of gravity and water acting on them as they move below the axis of rotation of the runner to said lower position, all the time the housing side wall acting on the outer sides of the blades.

The turbine of the present invention, in tests, has proven to operate at about 85 percent efficiency, an efficiency which is far higher than conventional low head water turbines. Unlike conventional low head turbines which must be constructed on a site-specific basis, the turbine of the present invention may be made in modular form to a uniform design and size. A plurality of similar turbines may be placed in a stream in series or parallel fashion to generate additional power.

BRIEF DESCRIPTION OF THE DRAWINGS

These and other objects and advantages of the invention will become apparent upon reading the following detailed description and upon referring to the drawings in which.

Figure 1:
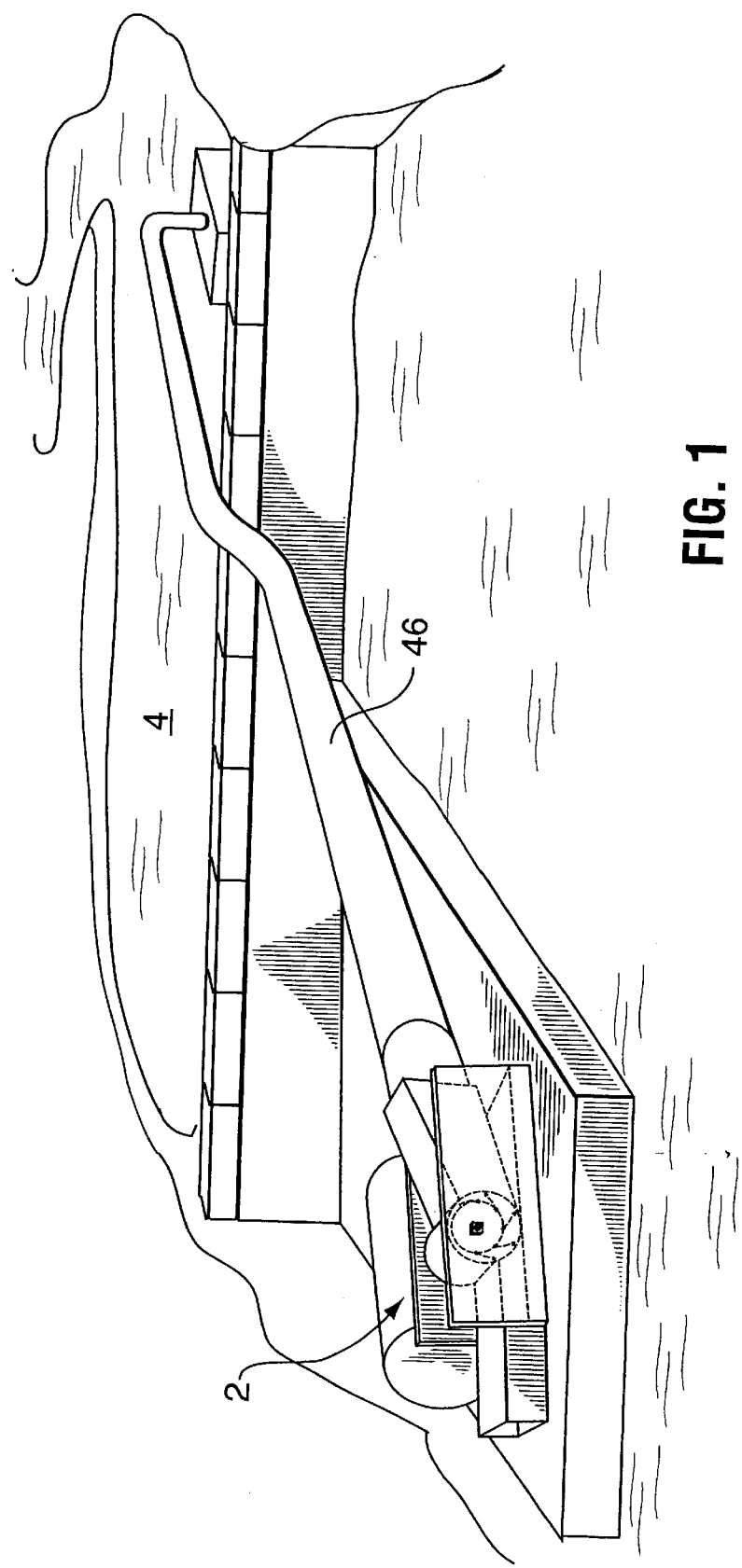
FIG. 1 is a schematic view of a water turbine according to the present invention in a low head stream arrangement.

While the invention will be described in conjunction with its illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

Figure 2:
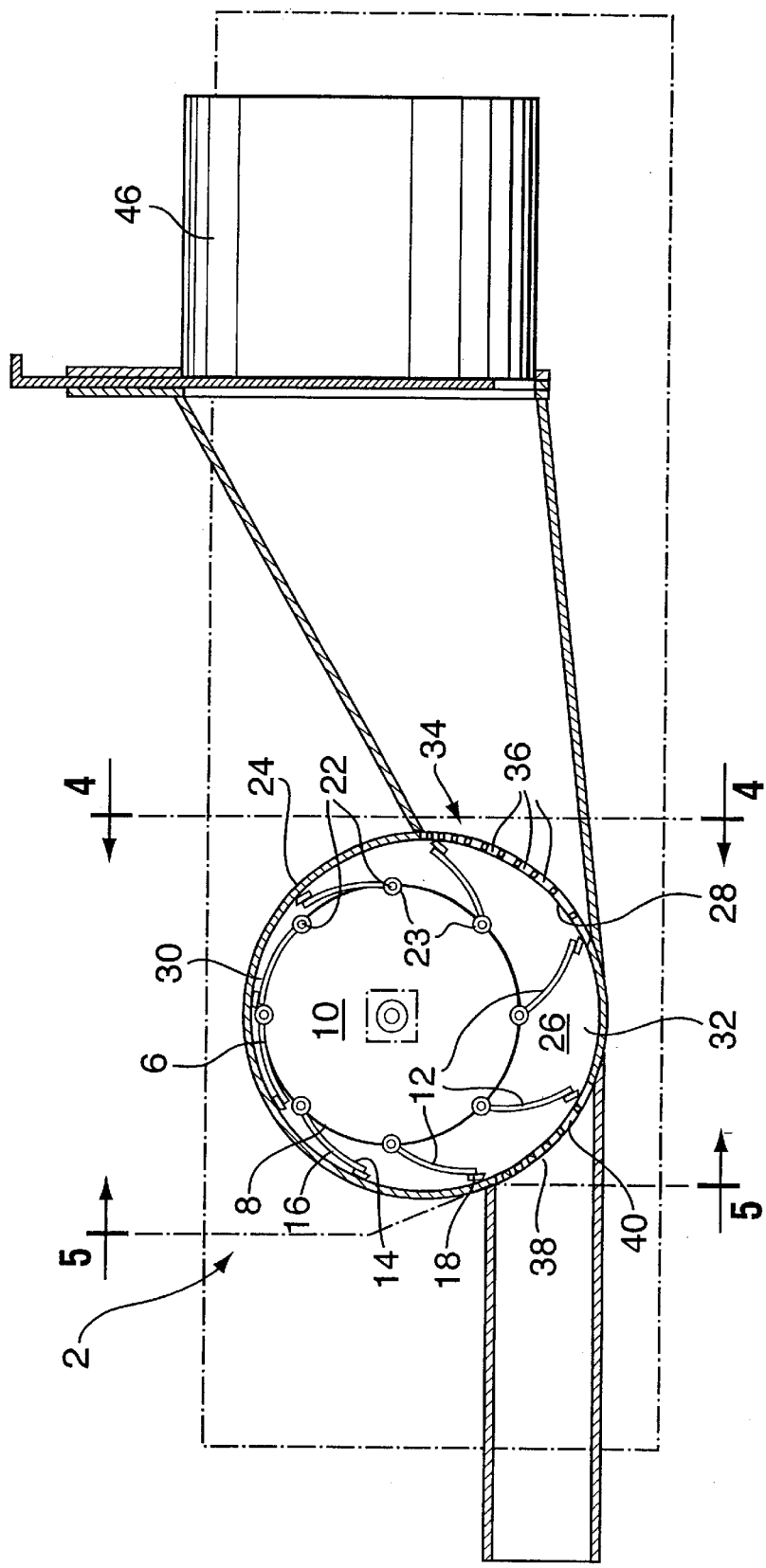
FIG. 2 is a schematic side view, in section, of the turbine according to the present invention.

Turning to FIGS. 1 and 2 there is illustrated a low head turbine (2) according to the present invention receiving water input from a stream (4).

Turbine (2) comprises a runner (6) having a cylindrical outer surface (8) extending between opposite ends (10). A plurality of similarly shaped and sized blades (12), having inner sides (14) and outer sides (16) extending between ends (10) are spaced evenly about the surface (8) of runner (6) as illustrated, and extend between the ends (10) of runner (6). Along the outer side (16) are preferably secured strips (18) of a low friction plastic. The inner sides (14) of blades (12) are pivotally secured at pivots (22) to the outer surface (8) of runner (6), in such a manner that the blades can pivot in the direction of rotation of the runner, between a closed position lying adjacent the outer surface (8) of the runner and an open position at an angle thereto. Appropriate biasing means (23) in the form of a spring, resilient cushion or counter weights (not illustrated), may be associated with each blade (12) and cylindrical outer surface (8) so as to normally urge the blades to open position.

Figure 3:
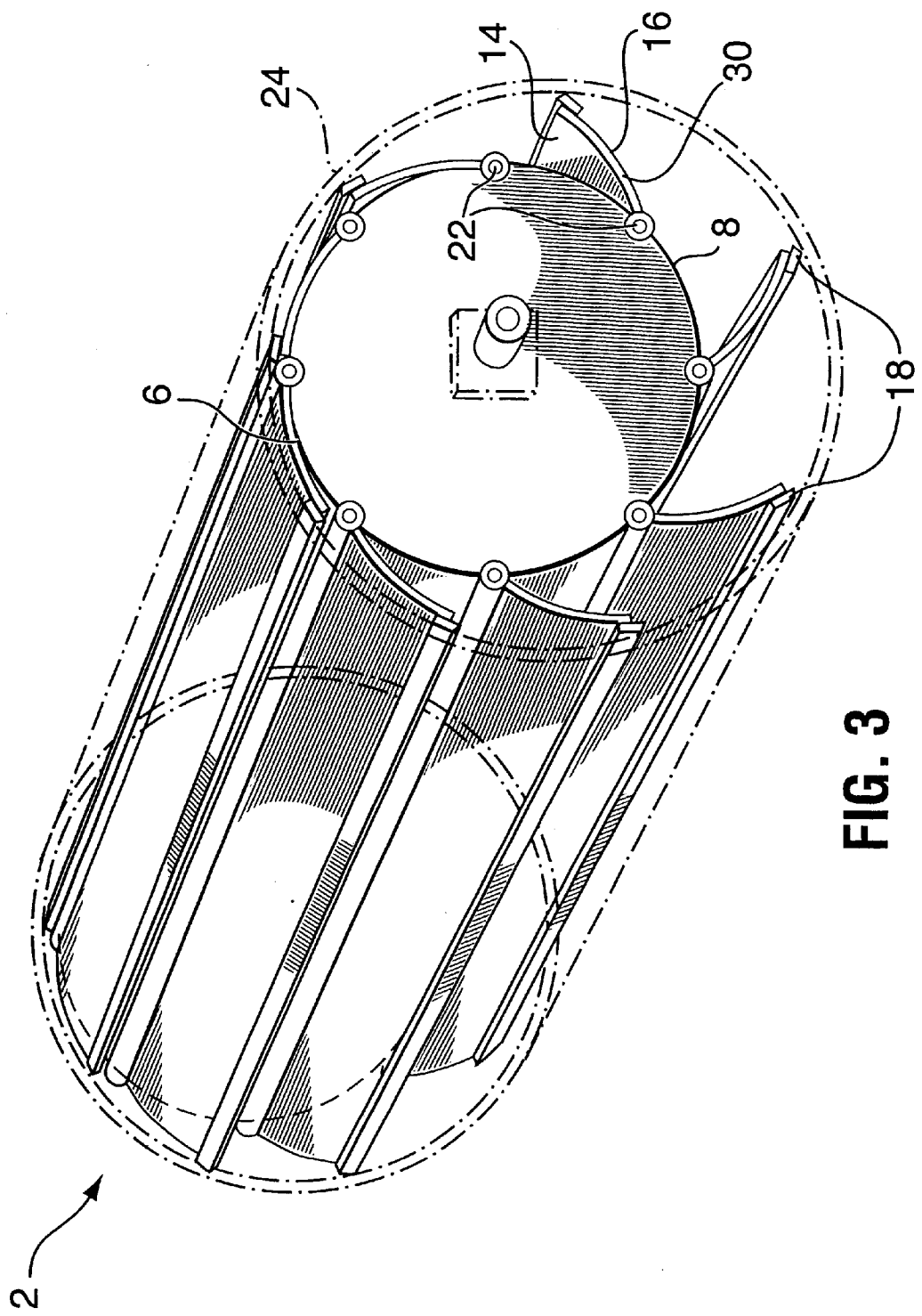
FIG. 3 is a schematic perspective partial view of the runner of the turbine of FIG. 2.
Figure 4:
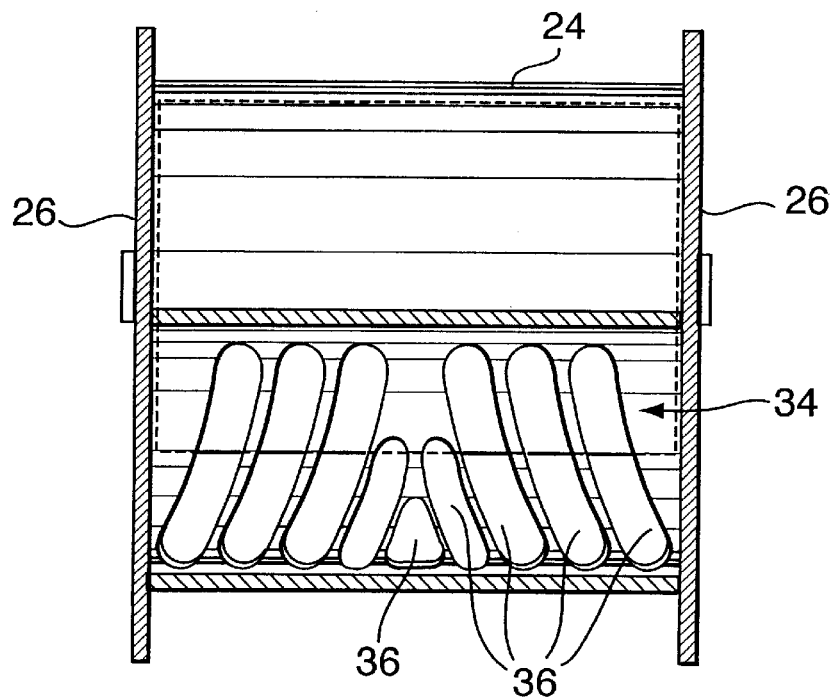
FIG. 4 is a section view along the line 4—4 of FIG. 2 showing the up stream, entrance to that turbine.

A housing (24), having end walls (26) and a rounded side wall (28), which may be of circular or irregularly rounded shape in cross section, completely encases runner (6), with the end walls (26) of the housing being proximal to the ends (10) of the runner (6). Runner (6) is eccentrically mounted, as can be seen in FIG. 2, to housing end walls (26), within the housing for rotation about a horizontal axis so that, in operation, runner (6) is spaced closer to an upper portion (30) of the housing side wall (28) and further from a lower portion (32) of that housing side wall. A water inlet (34) is provided in housing sidewall (28) as illustrated (FIG. 4), instead of being a single large opening, inlet (34) is formed by a plurality of slots (36) which thus act like a grating which can support blades (12), as will be described subsequently, during operation of the device. Slots (36) may be formed as illustrated so that the area thereof increases progressively from top to bottom of inlet (34) so as to permit progressively greater inflow of water from the top to bottom, although this construction is optional. Water inlet opening (34) is located, as can be seen in FIG. 3, in a lower, forward portion of side wall (28) of housing (24), below the axis of rotation A of the runner, although the opening may also extend above that axis.

Figure 5:
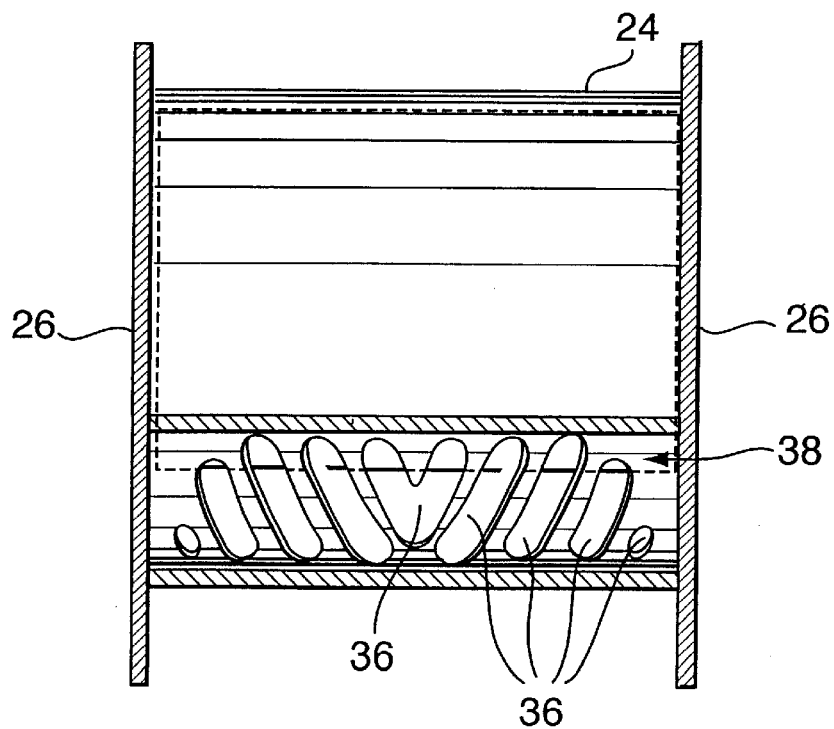
FIG. 5 is a section view along the line 5—5 of FIG. 2 showing the down stream exit of the turbine of the present invention.

A water outlet opening (38) is provided in a lower, rearward portion of side wall (28) of housing (24) as illustrated (FIG. 5), outlet (38) similarly formed by a plurality of spaced slots (40) in the side wall (28) of housing (24).

Figure 6:
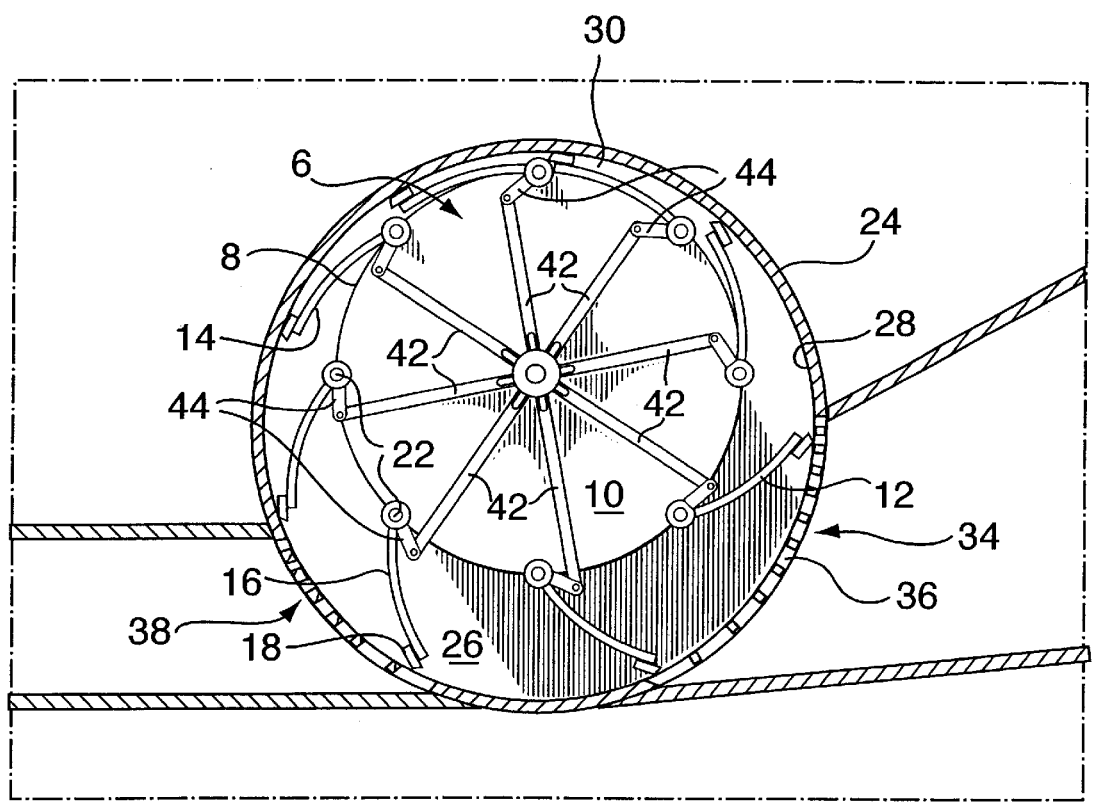
FIG. 6 is a schematic side section view of an alternative embodiment of runner for a turbine according to the present invention.

In the alternative embodiment illustrated in FIG. 6, blades (12) are secured to the runner in diametrically opposite pairs and mechanical links (42) are provided between arms (44) connected to the diametrically opposed pairs of blades (12), in such a manner that movement of one blade (12) from open to closed position, in each such pair, causes movement of the diametrically opposed blade from closed to open position. In this way, opening of blades (12) is facilitated.

In operation, because of the eccentrically mounted runner (6) within housing (24), as water from inlet (34) flows against opening blades (12) in the lower, forward (upstream) portion of housing (24), runner (6) is moved about axis A in a clockwise motion. Blades (12), with their outer sides (or strips (18) attached thereto) being constricted by the inner surfaces of side wall (28) of housing (24), are moved to closed position as they approach and pass the upper portion (30) of housing side wall (24) and are moved to open position under centrifugal force and the force of gravity and water (and action of links (42) and arms (44) or counterweights (not illustrated) if they are present), as the blades move below the axis of rotation A to the lower portion (32) of housing (24).

Because the flow of water into housing (24) through inlet opening (34) is directed at the blades in the lower portion of housing (24), and because there is little opportunity for water to escape between the ends of the blades and the ends of the housing, and between the outer edges of the blades and the corresponding inner surface of the side wall of the housing in the lower portion of the housing, most of the water flowing into the housing is able to effectively and efficiently bear against blades (12) in their open position in this lower section of the housing, thereby causing rotation of runner (6). It is essentially the eccentric mounting of runner (6) within housing (24), and the pivoting blades, necessitated by the eccentric mounting of runner (6) which leads to the increased efficiency of operation of this turbine.

In some arrangements of turbine (2), a flow of water may have to be brought into inlet openings (34) by way of a pipe (46) (FIG. 1).

A plurality of turbines (2) as described may be placed in a waterway in either down stream (series) or side-by-side (parallel) arrangement. The series and parallel arrangements are suitable for different applications and provide different advantages, depending upon the characteristics of a particular stream location.

Conventional means of converting the mechanical energy from the rotation of the runner (6) to electrical energy may be combined with the turbine for production of electricity.

Thus, it is apparent that there has been provided in accordance with the invention a low head water turbine device that fully satisfies the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What we claim as our invention:

1. A low head water turbine comprising:
    (a) a runner having a cylindrical outer surface extending between opposite ends;
    (b) a plurality of similar blades having inner and outer sides extending to the ends, the blades evenly spaced about the surface of the runner and extending to the ends of the runner, the blades similarly pivotably secured along their inner sides to the outer surface of the runner so as to pivot in the direction of rotation of the runner between, closed position lying adjacent the outer surface of the runner and an open position at an angle thereto;
    (c) a housing having end walls and a rounded side wall extending therebetween, completely encasing the runner and its blades, the end walls of the housing being proximal to the ends of the runner, the runner eccentrically mounted to the end walls of the housing for rotation about a horizontal axis so that the cylindrical outer surface of the runner is spaced closer to an upper portion of the housing side wall and farther from a lower portion thereof;
    (d) a water inlet opening located in a lower, forward portion of the housing and below the axis of rotation of the runner; and
    (e) a water outlet opening located in a lower, rearward portion of the housing;
the blades constructed and positioned so that, during operation of the turbine, the blades will be constricted by the side wall of the housing and thereby moved to the closed position as they approach and pass said upper portion of the housing side wall, and will move to the open position under centrifugal force and the force of gravity and water acting on them as they move below the axis of rotation of the runner to said lower position, all the time the housing side wall acting on the outer sides of the blades.

2. A turbine according to claim 1, wherein the blades are curved along a transverse axis so as, when in the closed position, to conform to the surface of the runner.

3. A turbine according to claim 1, wherein the inlet opening is formed by series of spaced slots in the wall of the housing.

4. A turbine according to claim 3, wherein the total area of the spaced slots progressively increases from top to bottom of the inlet opening so as to permit progressively greater inflow of water from top to bottom of said inlet opening.

5. A turbine according to claim 3, wherein the outlet opening is formed by a series of spaced slots in the wall of the housing.

6. A turbine according to claim 4, wherein the outlet opening is formed by a series of spaced slots in the wall of the housing.

7. A turbine according to claim 1, wherein elongated flexible strips are secured to the outer sides of the blades, during operation so as to reduce passage of water between the outer sides of the blades and the housing wall.

8. A turbine according to claim 7, wherein the strips are made of a low friction plastic.

9. A turbine according to claim 1, wherein the blades are secured to the runner in diametrically opposed pairs and linkage means are provided between the diametrically opposed pairs, whereby movement of one blade progressively from the open to the closed position causes corresponding progressive movement of the diametrically opposed blade from the closed to the open position.

10. A turbine according to claim 1, wherein the blades are provided with means to bias them towards the open position.

* * * * *